United States Patent
Lin et al.

(10) Patent No.: US 11,327,845 B2
(45) Date of Patent: May 10, 2022

(54) IMAGE SYNCHRONIZATION METHOD AND DEVICE, AND SERVER

(71) Applicant: GUANGDONG OPPO MOBILE TELECOMMUNICATIONS CORP., LTD., Guangdong (CN)

(72) Inventors: Lian Lin, Guangdong (CN); Jin Liu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 419 days.

(21) Appl. No.: 16/684,350

(22) Filed: Nov. 14, 2019

(65) Prior Publication Data

US 2020/0081799 A1  Mar. 12, 2020

Related U.S. Application Data

(63) Continuation of application No. PCT/CN2018/087878, filed on May 22, 2018.

(30) Foreign Application Priority Data

May 27, 2017 (CN) .......................... 201710393125.9

(51) Int. Cl.
*G06F 12/00* (2006.01)
*G06F 11/14* (2006.01)
(Continued)

(52) U.S. Cl.
CPC ...... *G06F 11/1458* (2013.01); *G06F 11/1448* (2013.01); *G06F 16/54* (2019.01); *H04L 67/1095* (2013.01); *H04L 67/2828* (2013.01)

(58) Field of Classification Search
CPC .. G06F 11/1458; G06F 11/1448; G06F 16/54; G06F 3/0646; G06F 3/0647;
(Continued)

(56) References Cited

U.S. PATENT DOCUMENTS 9,300,737 B1  3/2016 Agsen et al.
2014/0040811 A1  2/2014 Brahmanapalli
(Continued)

FOREIGN PATENT DOCUMENTS

CN  102739682 A  10/2012
CN  103179156 A  6/2013
(Continued)

OTHER PUBLICATIONS

OA with English translation for CN application 201710393125.9 dated Dec. 26, 2018.
(Continued)

*Primary Examiner* — Shawn X Gu
(74) *Attorney, Agent, or Firm* — Young Basile Hanlon & MacFarlane, P.C.

(57) ABSTRACT

The present disclosure provides an image synchronization method and device, and a server. The method includes: receiving an image backup request sent by a first terminal logging into a cloud account, the image backup request carrying a first image to be backed up; obtaining summary formation of the first image according to the image backup request, the summary information being configured to describe the first image; determining whether the summary information is synchronized to a second terminal logging into the cloud account; and in response to determining that the summary information is not synchronized to the second terminal, synchronizing the summary information to the second terminal.

20 Claims, 8 Drawing Sheets

(51) Int. Cl.
*G06F 16/54* (2019.01)
*H04L 67/1095* (2022.01)
*H04L 67/5651* (2022.01)

(58) Field of Classification Search
CPC ... G06F 3/065; G06F 3/0683; H04L 67/1095; H04L 67/2828
See application file for complete search history.

(56) References Cited

U.S. PATENT DOCUMENTS

| | | | |
|---|---|---|---|
| 2014/0289225 | A1* | 9/2014 | Chan .................. G06F 16/51 707/722 |
| 2017/0021875 | A1 | 1/2017 | Lee et al. |

FOREIGN PATENT DOCUMENTS

| CN | 103458016 A | | 12/2013 |
|---|---|---|---|
| CN | 103731488 A | * | 4/2014 |
| CN | 103731488 A | | 4/2014 |
| CN | 103973813 A | | 8/2014 |
| CN | 104092749 A | * | 10/2014 |
| CN | 104092749 A | | 10/2014 |
| CN | 106302642 A | | 1/2017 |
| CN | 106453572 A | | 2/2017 |
| CN | 107277117 A | | 10/2017 |
| JP | 2016162295 A | | 9/2016 |
| WO | 2016192327 A1 | | 12/2016 |

OTHER PUBLICATIONS

SR with English translation for PCT application PCT/CN2018/087878 dated Aug. 7, 2018.
Extended EP Search Report for EP application 18810849.2 dated Mar. 13, 2020.
English Translation of Office Action for CN application 201710393125.9 dated May 8, 2019.
English translation of Decision of Rejection for Chinese Application No. 201710393125.9 dated Aug. 26, 2019.
Office Action issued for Indian Application No. 201917043209 dated Dec. 29, 2020.
Office Action issued for European Application No. 18810849.2 dated Mar. 2, 2021.

* cited by examiner 501 sending an image backup request carrying a first image to a server, the image backup request being configured to request to back up the first image 502 obtaining and saving summary information of the first image from a server, the summary information being configured to describe the first image 503 deleting the first image from a terminal

IMAGE SYNCHRONIZATION METHOD AND DEVICE, AND SERVER

CROSS-REFERENCE TO RELATED APPLICATION(S)

This application is a continuation of an International Application No. PCT/CN2018/087878, filed on May 22, 2018, which claims priority to Chinese Patent Application No. 201710393125.9, filed on May 27, 2017, the contents of both of which are incorporated herein by reference in their entireties.

TECHNICAL FIELD

The present disclosure relates to a field of communication technologies, and more particular to an image synchronization method and device, and a server.

BACKGROUND

Since an electronic device, such as a phone, has a limited storage space, it is often necessary to back up data (for example, images) stored in the electronic device to a server for storage.

SUMMARY

Embodiments of the present disclosure provide an image synchronization method applicable to a server. The method includes:
receiving an image backup request sent by a first terminal logging into a cloud account, the image backup request carrying a first image to be backed up and the image backup request being configured to request to back up the first image;
obtaining summary information of the first image based on the image backup request, the summary information being configured to describe the first image;
determining whether the summary information is synchronized to a second terminal logging into the cloud account; and
in response to determining that the summary information is not synchronized to the second terminal, synchronizing the summary information to the second terminal.

Embodiments of the present disclosure provide a server. The server includes a memory, a processor and a computer program stored on the memory and executable by the processor. When the computer program is executed by the processor, the processor is caused to perform the above image synchronization method.

Embodiments of the present disclosure further provide a non-transitory computer readable storage medium. The non-transitory computer readable storage medium has instructions stored thereon. When the instructions are executed by a processor, the processor is configured to perform the above image synchronization method.

BRIEF DESCRIPTION OF DRAWINGS

In order to more clearly describe technical solutions of embodiments of the present application, drawings used in the description of embodiments will be briefly described below. Obviously, the drawings in the description are only some embodiments of the present application. Those skilled in the art may obtain other drawings according to these drawings without any creative work.

For a more complete understanding of the present application and related advantages, following description will be made in combination with the accompanying drawings.

DETAILED DESCRIPTION

Figure 1:
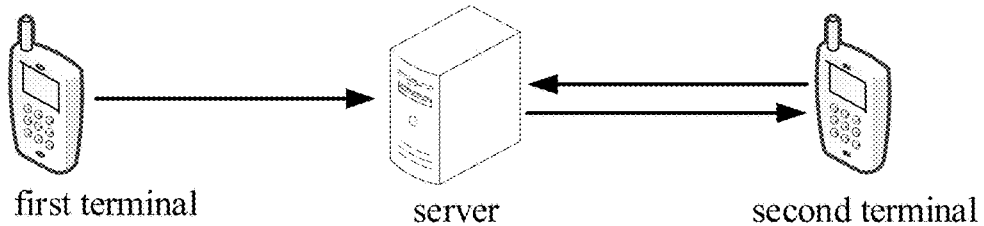
FIG. 1 is a schematic diagram illustrating an image synchronization method and device according to embodiments of the present disclosure.

As illustrated in drawings, same reference numerals may represent same components. A principle of the present application may be illustrated by an implementation in a suitable computing environment. Following descriptions may be based on specific embodiments of the present disclosure, which should not be construed as limiting specific embodiments that are not described herein.

In following descriptions, specific embodiments of the present application will be described with reference to steps and symbols of operations performed by one or more computers, unless otherwise stated. Thus, it will be appreciated that performing the steps and operations by a computer may include manipulation by a computer processing unit that represents an electronic signal of data in a structured format. The manipulation may convert the data or maintain it at a location in the memory system of the computer, which may be reconfigured or otherwise may alter the operation of the computer in a manner well known to those skilled in the art. The data structure maintained by the data is a physical location of the memory, which has specific characteristics defined by the data format. However, the principles of the present application are described in the above description, which is not intended to be a limitation, and those skilled in the art will appreciate that various steps and operations described below may also be implemented in hardware.

For a cloud system service, such as a cloud photo album, after data stored on a terminal side is backed up to a server side, related image data may be synchronized from the server side when it is desired to use the image. Taking a high-resolution image as an example, at every time when it is necessary to synchronize data, synchronizing the high-resolution image may cause a great amount of data traffic, spend a lot of time and affect an efficiency of data synchronization.

Embodiments of the present disclosure provide an image synchronization method applicable to a server, for reducing data traffic and improving efficiency.

The method includes: receiving an image backup request sent by a first terminal logging into a cloud account, the image backup request carrying a first image to be backed up and the image backup request being configured to request to back up the first image; obtaining summary information of the first image based on the image backup request, the summary information being configured to describe the first image; determining whether the summary information is synchronized to a second terminal logging into the cloud account; and in response to determining that the summary information is not synchronized to the second terminal, synchronizing the summary information to the second terminal.

In some embodiments, obtaining the summary information of the first image based on the image backup request includes: extracting the first image from the image backup request; and generating a thumbnail of the first image and determining the thumbnail of the first image as the summary information of the first image.

In some embodiments, the image backup request carries descriptive information of the first image, and obtaining the summary information of the first image based on the image backup request includes extracting the descriptive information of the first image from the image backup request and determining the descriptive information of the first image as the summary information of the first image.

In some embodiments, after the summary information is synchronized to the second terminal in response to determining that the summary information is not synchronized to the second terminal, the method further includes: obtaining an image synchronization request sent from the second terminal for obtaining a second image, the second image being a version of the first image with a preset resolution; processing the first image to generate the second image having the preset resolution; and sending the second image to the second terminal.

In some embodiments, sending the second image to the second terminal includes: encrypting the second image; and sending an encrypted second image to the second terminal.

In some embodiments, determining whether the summary information is synchronized to the second terminal logging into the cloud account includes: in response to detecting that the second terminal logs into the cloud account, obtaining terminal information of the second terminal; and determining whether the summary information is synchronized to the second terminal by querying a synchronization record based on the terminal information, the synchronization record being generated when the server performs a synchronization operation and being configured to record information of the synchronization operation.

In some embodiments, after the summary information is synchronized to the second terminal in response to determining that the summary information is not synchronized to the second terminal, the method further includes updating the synchronization record after synchronizing the summary information is completed.

As illustrated in FIGS. 1, FIG. 1 is a schematic diagram illustrating a scene of an image synchronization method and device according to embodiment of the present disclosure.

Figure 2:
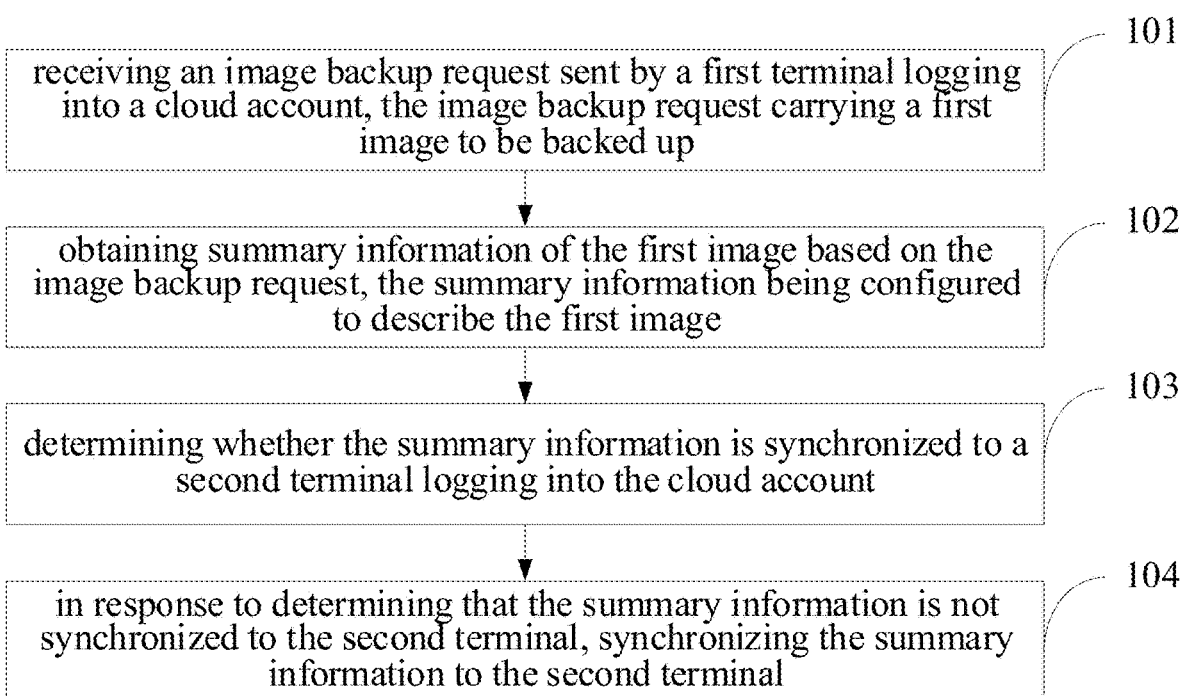
FIG. 2 is a first flowchart illustrating an image synchronization method according to embodiments of the present disclosure.

As illustrated in FIG. 2, FIG. 2 is a flow chart illustrating an image synchronization method according to embodiments of the present disclosure. The method is mainly applicable to a server. In embodiments, the image synchronization method may include the followings.

At block 101, an image backup request sent by a first terminal logging into a cloud account is received. The image backup request carries a first image to be backed up and the image backup request is configured to request to back up the first image.

After the first terminal logs into the cloud account, in response to detecting that a newly added image is obtained, the newly added image may be sent to the server for backup. For example, after a user takes a picture with the first terminal to generate a new image, the new image may be automatically sent to the server for backup.

At block 102, summary information of the first image is obtained based on the image backup request. The summary information is configured to describe the first image.

The summary information may include a thumbnail and/or descriptive information of the first image. The descriptive information may be generated on a first terminal side. The descriptive information may include at least one of image type information, image size information, image capturing time information, image capturing location information, image version information, and the like. The thumbnail may be generated on a server side. After the server detects the first image sent by the first terminal, the thumbnail with a small size and a low resolution may be generated from the first image.

At block 103, it is determined whether the summary information is synchronized to a second terminal logging into the cloud account.

The server may determine whether the summary information is synchronized to the second terminal logging into the cloud account by querying a synchronization record. The synchronization record may be generated to record information of a synchronization operation when the server performs the synchronization operation. The information of the synchronization operation may include an identifier of an image corresponding to the synchronization operation, terminal information for initiating a synchronization request, and the like.

At block 104, the summary information is synchronized to the second terminal, in response to determining that the summary information is not synchronized to the second terminal.

Certainly, it may be understood, in response to determining that the summary information is already synchronized to the second terminal, it may be not necessary to synchronize the summary information. In some embodiments, the synchronization record may be updated after synchronization of the summary information is completed. Therefore, repeat synchronization of the summary information may be avoided when detecting later that the second terminal logs into the cloud account.

It may be seen from the above, with the image synchronization method according to embodiments of the present disclosure, the image backup request sent by the first terminal logging into the cloud account may be received, the image backup request carrying the first image to be backed up; the summary information of the first image may be obtained based on the image backup request, the summary information being configured to describe the first image; it may be determined whether the summary information is synchronized to the second terminal logging into the cloud account; and in response to determining that the summary information is not synchronized to the second terminal, the summary information is synchronized to the second terminal. Therefore, after the server side receives the first image sent by the first terminal, it may be not necessary to immediately synchronize the first image to the second terminal, but it may need to synchronize only the summary information of the first image to the second terminal, achieving beneficial effects of reducing data traffic, improving data synchronization efficiency, and saving memory space of the second terminal.

Figure 3:
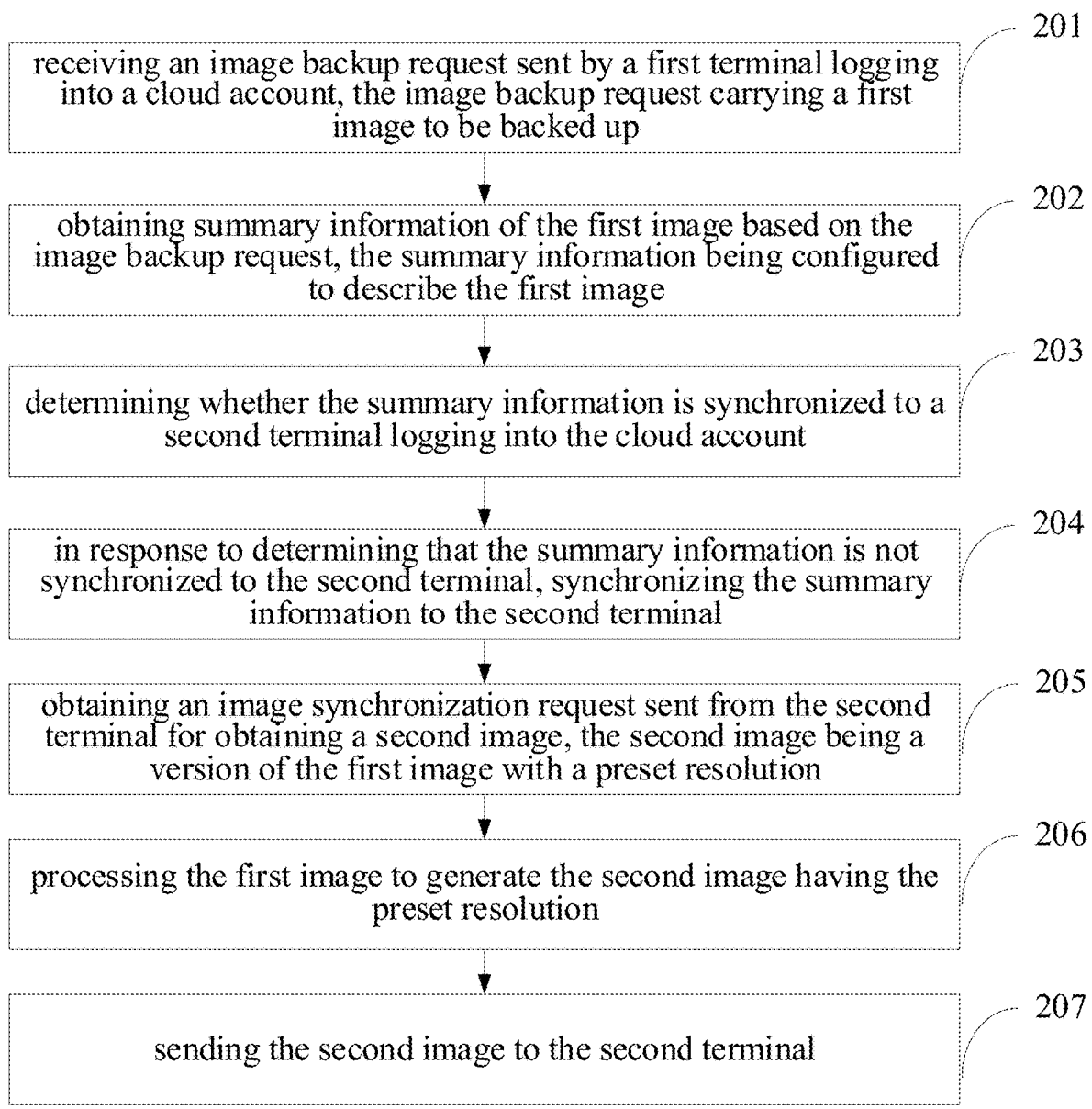
FIG. 3 is a second flowchart illustrating an image synchronization method according to embodiments of the present disclosure.

As illustrated in FIG. 3, FIG. 3 is another flowchart illustrating an image synchronization method according to embodiments of the present disclosure. The method is mainly applicable to a server. In embodiments, the image synchronization method may include the followings.

At block 201, an image backup request sent by a first terminal logging into a cloud account is received. The image backup request carries a first image to be backed up and the image backup request is configured to request to back up the first image.

After the first terminal logs into the cloud account, in response to detecting that a newly added image is obtained, the newly added image is sent to the server for backup. For example, after a user takes a picture with the first terminal to generate a new image, the new image may be automatically sent to the server for backup.

At block 202, summary information of the first image is obtained based on the image backup request. The summary information is configured to describe the first image.

The summary information may include a thumbnail and/or descriptive information of the first image. The descriptive information may be generated on a first terminal side. The descriptive information may include at least one of image type information, image size information, image capturing time information, image capturing location information, image version information, and the like. The thumbnail may be generated on a server side. After the server detects the first image sent by the first terminal, the thumbnail with a small size and a low resolution may be generated from the first image.

In actual applications, the block 202 may specifically include the followings.

At block 2021, the first image is extracted from the image backup request. In this block, both the first image and the descriptive information may be carried in the image backup request sent from the first terminal to the server. After the image backup request is detected, a corresponding first image may be extracted from the image backup request. In addition, the first image may be backed up and saved.

At block 2022, the first image is processed to generate the thumbnail of the first image, and the thumbnail of the first image is determined as the summary information of the first image. In this block, a resolution or a size of the thumbnail may be set in advance. For example, the size of each thumbnail may be uniformly set to be 2Kb. In some examples, the thumbnail may be generated by reducing the size or the resolution of the first image by 20 times.

At block 2023, the descriptive information of the first image is extracted from the image backup request and the descriptive information of the first image is determined as the summary information of the first image.

It may be understood, the block 2021 and the 2022 may be not necessary and the block 2023 may be also not necessary.

At block 203, it is determined whether the summary information is synchronized to a second terminal logging into the cloud account.

Figure 4:
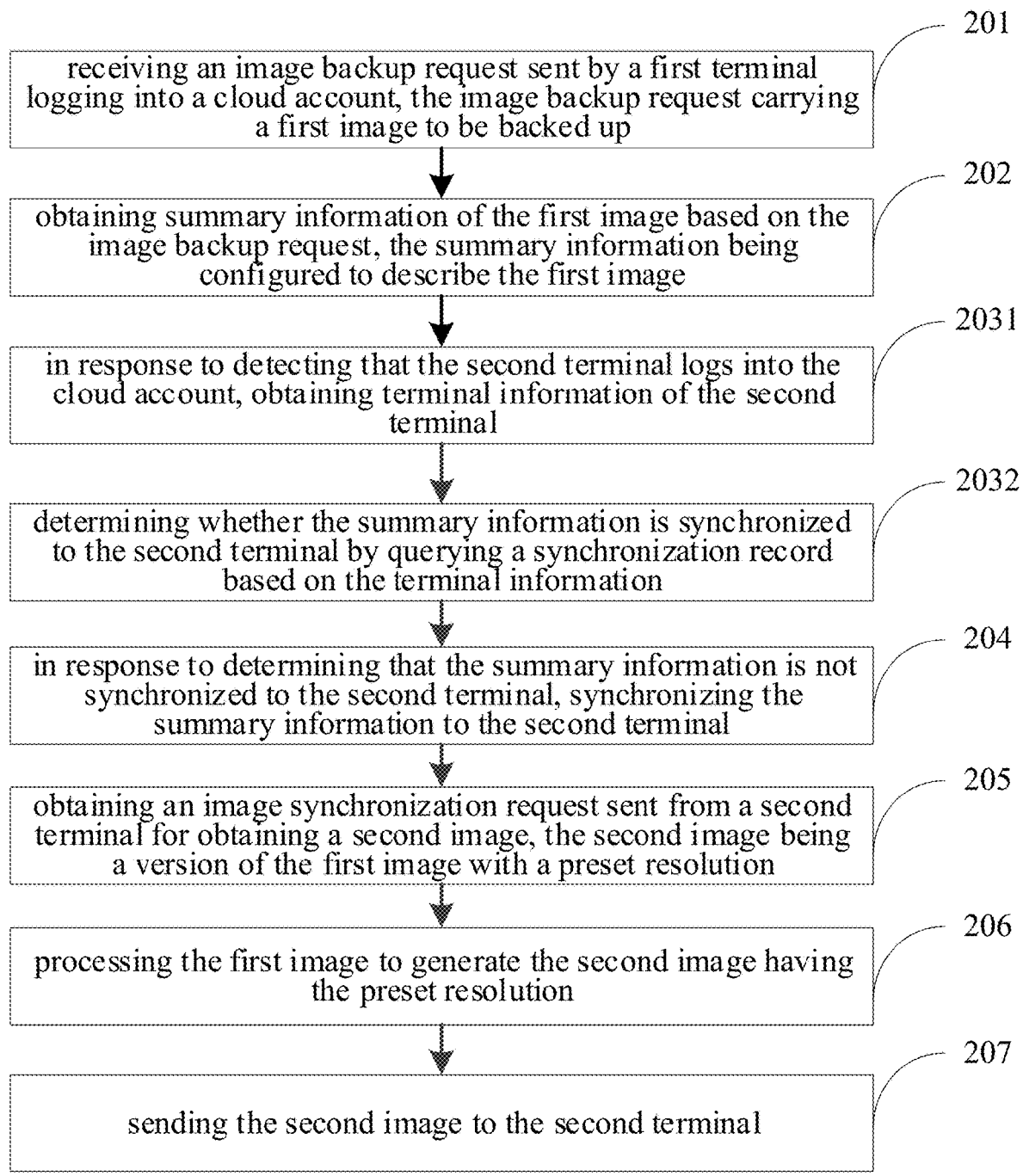
FIG. 4 is a third flowchart illustrating an image synchronization method according to embodiments of the present disclosure.

As illustrated in FIG. 4, in embodiments, it may be determined based on terminal information whether the summary information is synchronized to the second terminal. In practical applications, the block 203 may include the following.

At block 2031, in response to determining that the second terminal logs into the cloud account, terminal information of the second terminal is obtained. The terminal information may be information for identifying an identity of the second terminal, including such as SIM card information or physical address information.

At block 2032, it is determined whether the summary information is synchronized to the second terminal by querying a synchronization record based on the terminal information. The synchronization record is generated to record information of a synchronization operation when the server performs the synchronization operation. The information of the synchronization operation may include an identifier of an image corresponding to the synchronization operation, terminal information for initiating a synchronization request, and the like. Since the information of the synchronization operation may be generated every time the synchronization operation is performed by the server side, it may be determined whether the summary information is synchronized to the second terminal by querying the synchronization record.

At block 204, in response to determining that the summary information is not synchronized to the second terminal, the summary information is synchronized to the second terminal. Certainly, it may be understood, in response to determining that the summary information is already synchronized to the second terminal, it may be not necessary to synchronize the summary information. In some embodiments, the synchronization record may be updated after synchronization of the summary information is completed. Therefore, repeat synchronization of the summary information may be avoided when detecting later that the second terminal logs into the cloud account.

At block 205, an image synchronization request sent by the second terminal for acquiring a second image is received. The second image is a version of the first image with a preset resolution.

In the block 205, when the user views the summary information (for example, the thumbnail and/or the descriptive information) of the first image by viewing the second terminal and wants to view the version of the first image with the preset resolution, the image synchronization request may be sent to the server. The image synchronization request may carry an image identifier of the first image corresponding to the second image to be acquired and the preset resolution. The server may obtain the corresponding first image from a storage area according to the image identifier.

At block 206, the first image is processed to generate the second image with the preset resolution.

In the block 206, the server may process the first image to obtain the second image with the preset resolution based on the preset resolution. For example, the resolution of the first image stored in the server may be X1 and the resolution required by the user may be X2, where X1>X2. The server may directly scale the first image with the resolution X1 to the second image with the resolution of X2. The second image with a corresponding resolution may be sent to the second terminal according to actual needs of the user, so that it is unnecessary to transmit the first image to the second terminal, thereby reducing data traffic and improving data transmission speed.

At block 207, the second image is sent to the second terminal.

In the block 207, after the second image with the corresponding resolution is generated, the server may perform an encryption operation, for example, a symmetric encryption, on the second image. The encrypted second image may be synchronized to the second terminal.

It may be seen from the above, with the image synchronization method according to embodiments of the present disclosure, the image backup request sent by the first terminal logging into the cloud account may be received, the image backup request carrying the first image to be backed up; the summary information of the first image may be obtained based on the image backup request, the summary information may be configured to describe the first image; it may be determined whether the summary information is synchronized to the second terminal logging into the cloud account; and in response to determining that the summary information is not synchronized to the second terminal, the summary information is synchronized to the second terminal. Therefore, after the server side receives the first image sent by the first terminal, it may be not necessary to immediately synchronize the first image to the second terminal, but it may need to synchronize only the summary information of the first image to the second terminal, achieving beneficial effects of reducing data traffic, improving data synchronization efficiency, and saving memory space of the second terminal.

Figure 5:
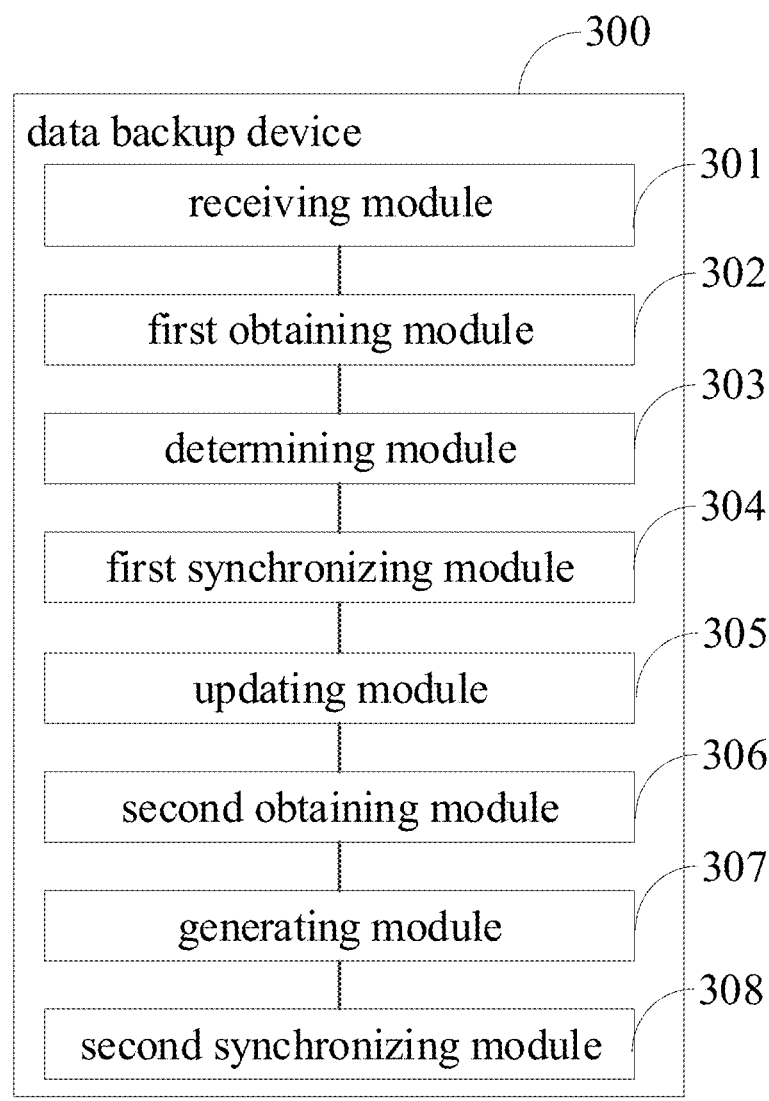
FIG. 5 is a first block diagram illustrating an image synchronization device according to embodiments of the present disclosure.

As illustrated in FIG. 5, FIG. 5 is a block diagram illustrating an image synchronization device according to embodiments of the present disclosure. The device is mainly applicable to a server. The image synchronization device 300 may include a receiving module 301, a first obtaining module 302, a determining module 303, a first synchronizing module 304, an updating module 305, a second obtaining module 306, a generating module 307 and a second synchronizing module 308.

The receiving module 301 may be configured to receive an image backup request sent by a first terminal logging into a cloud account. The image backup request carries a first image to be backed up and the image backup request is configured to request to back up the first image. After the first terminal logs into the cloud account, in response to detecting that a newly added image is obtained, the newly added image may be sent to the server for backup. For example, after a user takes a picture with the first terminal to generate a new image, the new image may be automatically sent to the server for backup.

The first obtaining module 302 may be configured to obtain summary information of the first image based on the image backup request. The summary information may be configured to describe the first image.

In actual applications, the summary information may include a thumbnail and/or descriptive information of the first image. The descriptive information may be generated on a first terminal side. The descriptive information may include at least one of image type information, image size information, image capturing time information, image capturing location information, image version information, and the like. The thumbnail may be generated on a server side. After the server detects the first image sent by the first terminal, the thumbnail with a small size and a low resolution may be generated from the first image.

The determining module 303 may be configured to determine whether the summary information is synchronized to a second terminal logging into the cloud account. The server may determine whether the summary information is synchronized to the second terminal logging into the cloud account by querying a synchronization record. The synchronization record may be generated to record information of a synchronization operation when the server performs the synchronization operation. The information of the synchronization operation may include an identifier of an image corresponding to the synchronization operation, terminal information for initiating a synchronization request, and the like. The terminal information may be information for identifying an identity of the second terminal, including such as SIM card information or physical address information.

Figure 6:
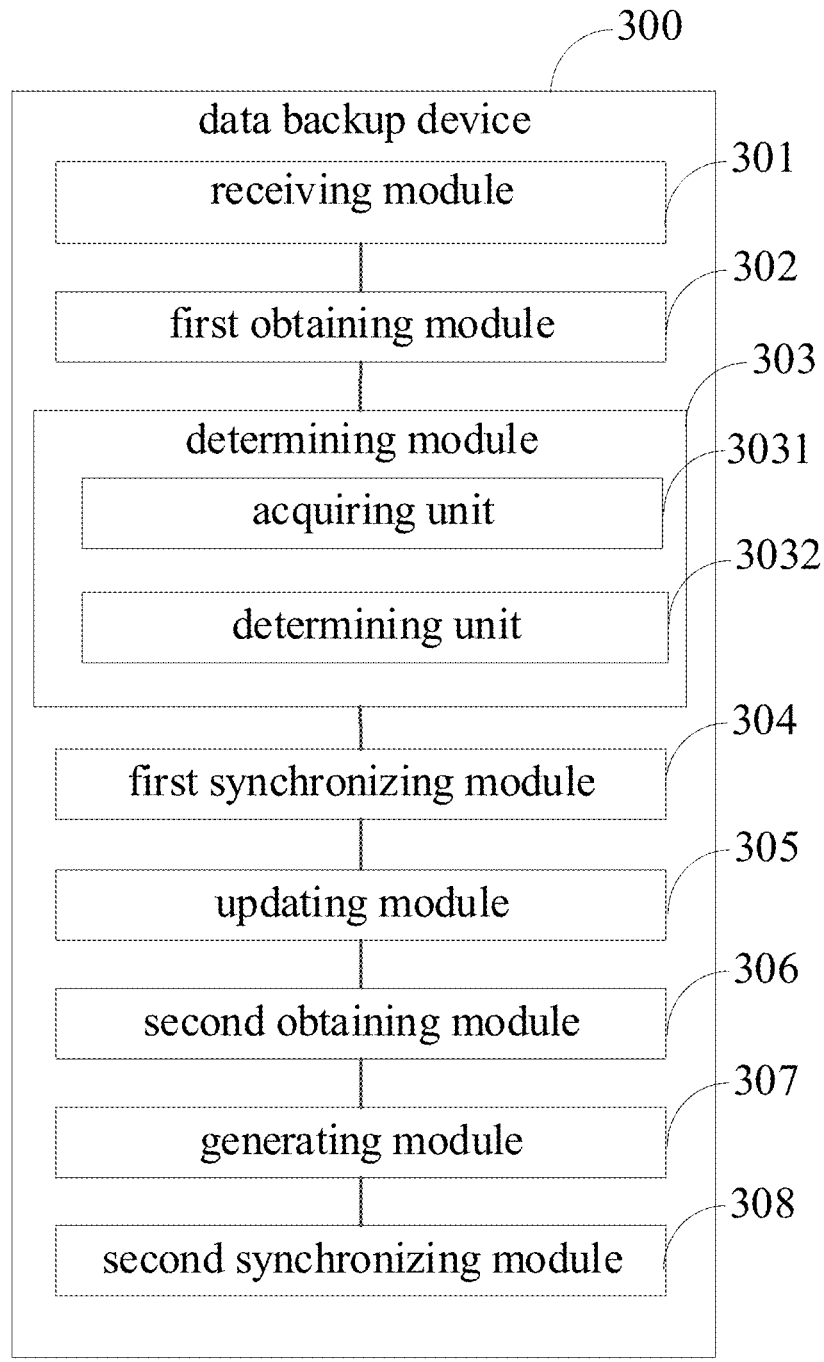
FIG. 6 is a second block diagram illustrating an image synchronization device according to embodiments of the present disclosure.

As illustrated in FIG. 6, the determining module 303 may include an obtaining unit 3031 and a determining unit 3032.

The obtaining unit 3031 may be configured to obtain terminal information of the second terminal in response to determining that the second terminal logs into the cloud account. The terminal information may be information for identifying an identity of the second terminal, including such as SIM card information or physical address information.

The determining unit 3032 may be configured to determine whether the summary information is synchronized to the second terminal by querying a synchronization record based on the terminal information. The synchronization record may be generated to record information of a synchronization operation when the server performs the synchronization operation. The information of the synchronization operation may include an identifier of an image corresponding to the synchronization operation, terminal information for initiating a synchronization request, and the like. Since the information of the synchronization operation may be generated every time the synchronization operation is performed on the server side, it may be determined whether the summary information is synchronized to the second terminal by querying the synchronization record.

The first synchronizing module 304 may be configured to, in response to determining that the summary information is not synchronized to the second terminal, synchronize the summary information to the second terminal. Certainly, it may be understood, in response to determining that the summary information is already synchronized to the second terminal, it may be not necessary to synchronize the summary information.

The updating module 305 may be configured to update the synchronization record after synchronizing the summary information by the first synchronizing module 304 is completed.

The second obtaining module 306 may be configured to obtain an image synchronization request sent by the second terminal for acquiring the second image. The second image may be a version of the first image with a preset resolution. When the user views the summary information (for example, the descriptive information and/or the thumbnail) of the first image through viewing the second terminal and wants to view the version of the first image with the preset resolution, the image synchronization request may be sent to the server. The image synchronization request may carry an image identifier of the first image corresponding to the second image to be acquired and the preset resolution. The server may obtain the corresponding first image from a storage area according to the image identifier.

The generating module 307 may be configured to process the first image to generate the second image with the preset resolution.

The server may process the first image to obtain the second image with the preset resolution based on the preset resolution. For example, the resolution of the first image stored in the server may be X1 and the resolution required by the user may be X2, where X1>X2. The server may directly scale the first image with the resolution X1 to the second image with the resolution of X2. The second image with the corresponding resolution may be sent to the second terminal according to actual needs of the user, so that it is unnecessary to transmit the original first image to the second terminal, thereby reducing data traffic and improving data transmission speed.

The second synchronizing module 308 may be configured to send the second image to the second terminal. After the second image with the corresponding resolution is generated, the server may perform an encryption operation, for example, a symmetric encryption, on the second image. The encrypted second image may be synchronized to the second terminal.

It may be seen from the above, with the image synchronization device according to embodiments of the present disclosure, the image backup request sent by the first terminal logging into the cloud account may be received, the image backup request carrying the first image to be backed up; the summary information of the first image may be obtained based on the image backup request, the summary information being configured to describe the first image; it may be determined whether the summary information is synchronized to the second terminal logging into the cloud account; and in response to determining that the summary information is not synchronized to the second terminal, the summary information is synchronized to the second terminal. Therefore, after the server side receives the first image sent by the first terminal, it may be not necessary to immediately synchronize the first image to the second terminal, but it may need to synchronize only the summary information of the first image to the second terminal, achieving beneficial effects of reducing data traffic, improving data synchronization efficiency, and saving memory space of the second terminal.

Embodiments of the present disclosure provides a storage medium, having multiple instructions stored thereon. The instructions may be loaded by a processor to cause the processor to: receive an image backup request sent by a first terminal logging into a cloud account, the image backup request carrying a first image to be backed up and the image backup request being configured to request to back up the first image; obtain summary information of the first image based on the image backup request, the summary information being configured to describe the first image; determine whether the summary information is synchronized to a second terminal logging into the cloud account; and in response to determining that the summary information is not synchronized to the second terminal, synchronize the summary information to the second terminal.

Embodiment of the present disclosure further provide a server. The server may include a memory, a processor, and a computer program stored on the memory and executable by the processor. When the computer program is executed by a processor, the processor is caused to implement: receiving an image backup request sent by a first terminal logging into a cloud account, the image backup request carrying a first image to be backed up and the image backup request being configured to request to back up the first image; obtaining summary information of the first image based on the image backup request, the summary information being configured to describe the first image; determining whether the summary information is synchronized to a second terminal logging into the cloud account; and in response to determining that the summary information is not synchronized to the second terminal, synchronizing the summary information to the second terminal.

In some embodiments, obtaining the summary information of the first image based on the image backup request may include: extracting the first image from the image backup request; and generating a thumbnail of the first image and determining the thumbnail of the first image as the summary information of the first image.

In some embodiments, the image backup request may carry descriptive information of the first image, and obtaining the summary information of the first image based on the image backup request may include extracting the descriptive information of the first image from the image backup request and determining the descriptive information of the first image as the summary information of the first image.

In some embodiments, after the summary information is synchronized to the second terminal in response to determining that the summary information is not synchronized to the second terminal, the processor is further caused to implement: obtaining an image synchronization request sent from the second terminal for obtaining a second image, the second image being a version of the first image with a preset resolution; processing the first image to generate the second image having the preset resolution; and sending the second image to the second terminal.

In some embodiments, sending the second image to the second terminal includes: performing an encryption operation on the second image; and sending an encrypted second image to the second terminal.

In some embodiments, determining whether the summary information is synchronized to the second terminal logging into the cloud account may include: in response to detecting that the second terminal logs into the cloud account, obtaining terminal information of the second terminal; and determining whether the summary information is synchronized to the second terminal by querying a synchronization record based on the terminal information, the synchronization record being generated when a server performs a synchronization operation and being configured to record information of the synchronization operation.

In some embodiments, after the summary information is synchronized to the second terminal in response to determining that the summary information is not synchronized to the second terminal, the processor is further caused to update the synchronization record after synchronizing the summary information is completed.

For example, embodiments of the present disclosure further provide a server, which may be a server located on a network or may be a computer device such as a personal PC.

Figures 7, 8:
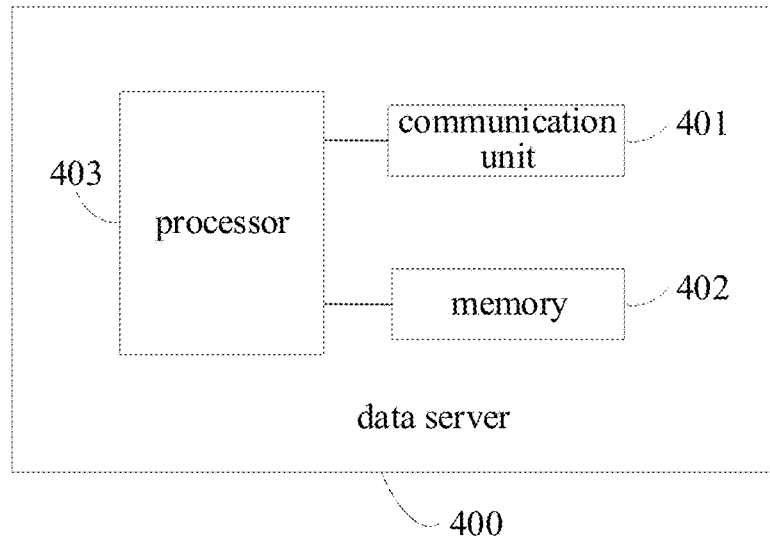
FIG. 7 is a block diagram illustrating a server according to embodiments of the present disclosure.
FIG. 8 is a fourth flowchart illustrating an image synchronization method according to embodiments of the present disclosure.

As illustrated in FIG. 7, the server 400 may include a communication unit 401, a memory 402 including one or more computer readable storage media, and a processor 403 including one or more processing cores.

The communication unit 401 may be configured to communicate with a network device or other electronic devices through network to complete information transmission and reception between the server 400 and the network device or other electronic devices. For example, the communication unit 401 may be configured to communicate with other servers or electronic devices such as smart phones, tablets, and the like through the network.

The memory 402 may be configured to store an application and data. The application stored in the memory 402 may contain executable program codes. The application may form various functional modules. The processor 403 may be configured to execute various functional applications and data processing by running the application stored in the memory 402. The memory 402 may mainly include a program storing area and a data storing area. The program storing program area may be configured to store an operating system, an application required for at least one function, and the like. The data storing area may be configured to store data created by the server 400 or exchanged with other electronic devices.

The processor 403 may be a control center of the server 400, and may be configured to connect various parts of the server 400 via various interfaces and lines, to execute various functions and data processing of the server 400 by running or executing the application stored in the memory 402 and by calling data stored in the memory 402 to provide overall monitoring of the server 400.

In embodiments, the processor 403 of the server 400 may be configured to load the executable program codes corresponding to routines of one or more application programs into the memory 402 according to following instructions, such that the application programs stored in the memory 402 may be executed by the processor 403 to implement following functions of receiving an image backup request sent by a first terminal logging into a cloud account, the image backup request carrying a first image to be backed up and the image backup request being configured to request to back up the first image; obtaining summary information of the first image based on the image backup request, the summary information being configured to describe the first image; determining whether the summary information is synchronized to a second terminal logging into the cloud account; and in response to determining that the summary information is not synchronized to the second terminal, synchronizing the summary information to the second terminal.

Certainly, refinement and expansion of respective functions have been described in detail in the above image synchronization method and device, which will not be elaborated herein.

It may be seen from the above, in response to detecting the first image sent by the first terminal, the summary information of the first image may be obtained, the terminal information of at least one second terminal associated with the first terminal may be obtained, and the summary information may be synchronized to the second terminal based on the terminal information. That is, it may be not necessary to synchronize the first image to the second terminal associated with the first terminal after the server side receives the first image sent from the first terminal, but it may merely need to synchronize the summary information to the second terminal, achieving beneficial effects of reducing data traffic and improving data synchronization efficiency.

As illustrated in FIG. 8, embodiments of the present disclosure provide an image synchronization method applicable to an electronic device. The electronic device may be a terminal such as a smart phone or a tablet computer. Taking the terminal as an example, the method may include the followings.

At block 501, an image backup request carrying a first image is sent to the server. The image backup request may be configured to request to back up the first image. In response to detecting by the terminal that a new first image is generated, the image backup request may be sent to the server. The image backup request may carry the first image to be backed up.

At block 502, summary information of the first image sent from the server is obtained and stored. The summary information may be configured to describe the first image. After the image backup request is received, the server may be configured to extract the first image from the image backup request for backup and to extract the summary information of the first image from the image backup request. The summary information may include a thumbnail and/or descriptive information of the first image. The descriptive information may be generated on a terminal side. The descriptive information may include at least one of image type information, image size information, image capturing time information, image capturing location information, image version information, and the like. This thumbnail may be generated on a server side. After the server detects the first image sent by the terminal, the thumbnail with a small size and a low resolution may be generated from the first image.

At block 503, the first image is deleted from the terminal. After the summary information is obtained, the first image may be directly deleted. The first image may be obtained from the server when it is desired to view the first image in a subsequent operation, thereby achieving a beneficial effect of saving a storage space of the terminal.

Figure 9:
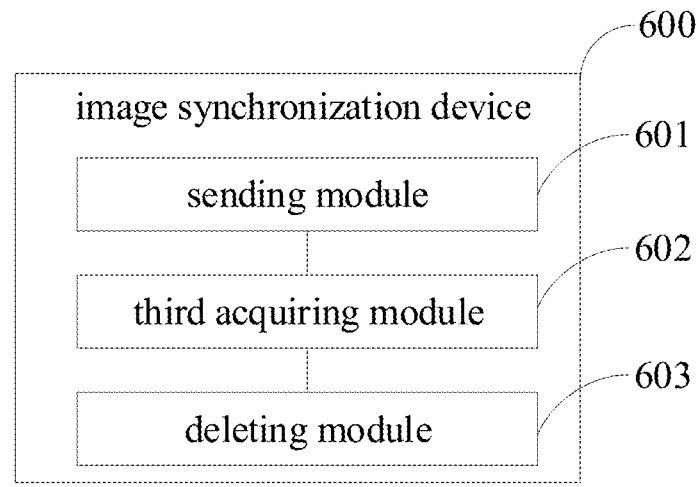
FIG. 9 is a third block diagram illustrating an image synchronization device according to embodiments of the present disclosure.

As illustrated FIG. 9, embodiments of the present disclosure further provide an image synchronization device 600. The image synchronization device 600 may include a sending module 601, a third obtaining module 602, and a deleting module 603.

The sending module 601 may be configured to send an image backup request carrying a first image to the server. The image backup request may be configured to request to back up the first image;

The third obtaining module 602 may be configured to obtain and store summary information of the first image returned by the server. The summary information may be configured to describe the first image.

The deleting module 603 may be configured to delete the first image from the terminal. After the summary information is obtained, the device may directly delete the first image. The first image may be obtained from the server when it is desired to view the first image in a subsequent operation, thereby achieving a beneficial effect of saving a storage space of the terminal.

Figure 10:
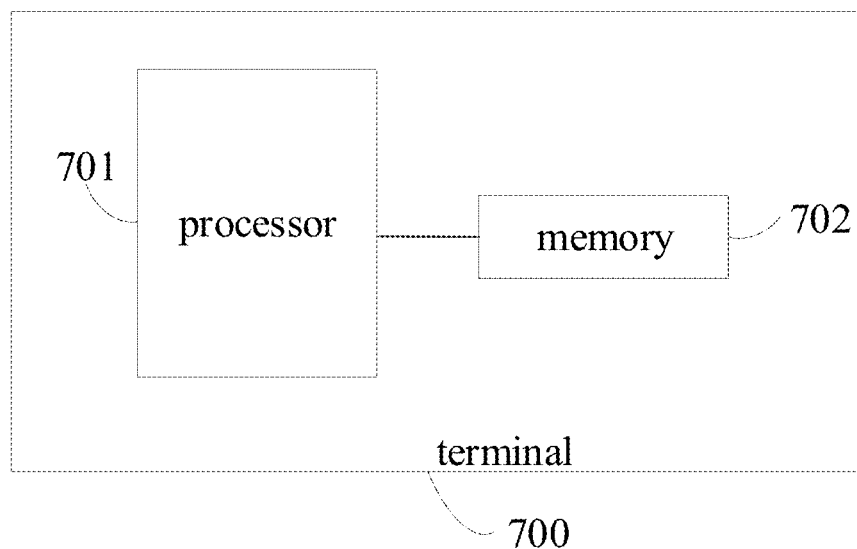
FIG. 10 is a first block diagram illustrating an electronic device according to embodiments of the present disclosure.

As illustrated in FIG. 10, FIG. 10 is a block diagram illustrating an electronic device according to embodiments of the present disclosure. The electronic device may be a terminal such as a smart phone or a tablet computer. The electronic device 700 may include a processor 701, a memory 702. By calling a computer program stored in the memory 702, the processor 701 may be configured to: send an image backup request carrying a first image to a server, the image backup request being configured to request to back up the first image; obtain and store summary information of the first image returned by the server, the summary information being configured to describe the first image; and delete the first image from the electronic device.

Figure 11:
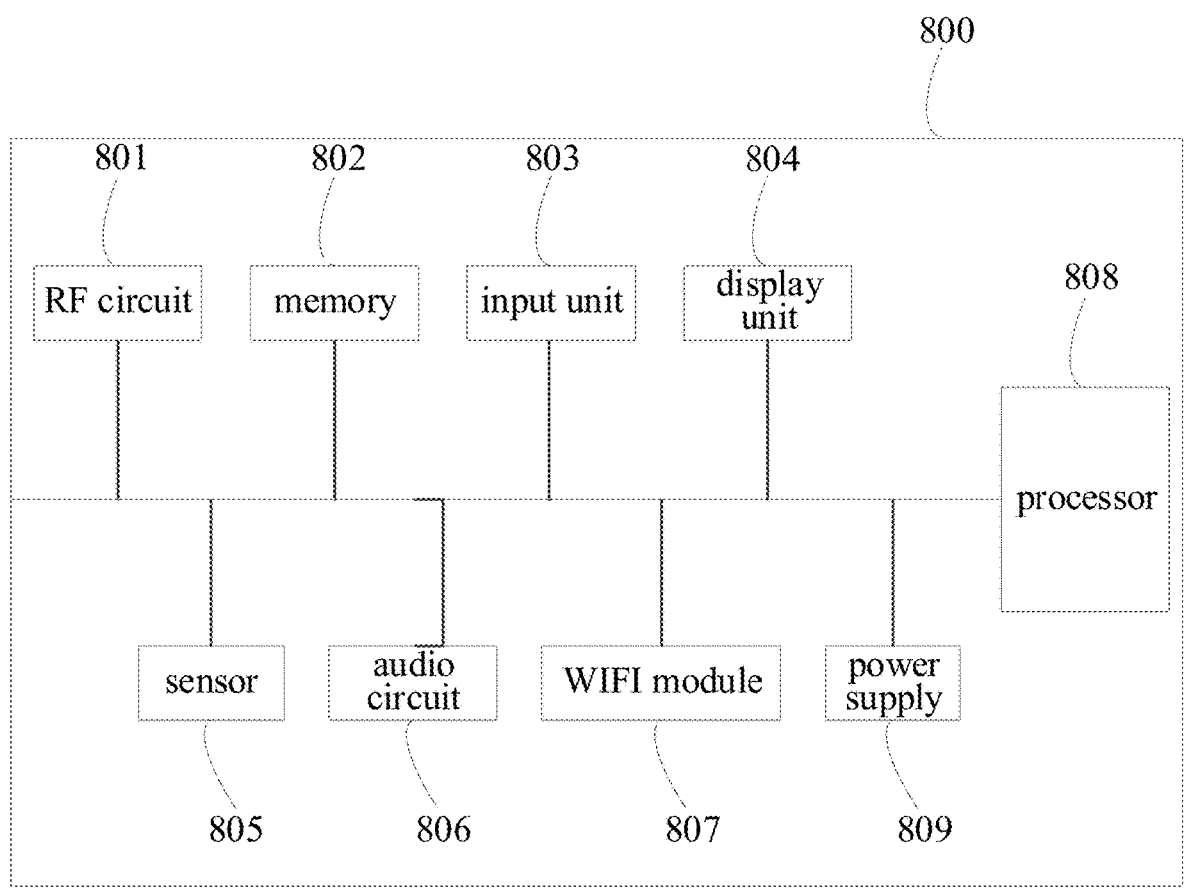
FIG. 11 is a second block diagram illustrating an electronic device according to embodiments of the present disclosure.

As illustrated in FIG. 11, FIG. 11 is a block diagram of an electronic device according to embodiments of the present disclosure. The electronic device 800 may be a mobile phone, a tablet, or the like. The electronic device 800 may include a radio frequency (RF) circuit 801, a memory 802 including one or more computer readable storage media, an input unit 803, a display unit 804, a sensor 805, an audio circuit 806, a wireless fidelity (WiFi) module 807, a processor 808 including one or more processing cores, a power supply 809 and the like. It will be understood by those skilled in the art that the structure illustrated in FIG. 11 may be not construed as a limitation on the electronic device. The electronic device may include more or less components than those illustrated, or a combination of certain components, or different component arrangements.

The RF circuit 801 may be configured to receive and transmit a signal during message communication or a call. Specifically, after receiving downlink information of a base station, the downlink information may be processed by one or more processors 808. In addition, the data related to the uplink may be sent to the base station. Generally, RF circuit 801 may include, but not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 801 may also communicate with a network and other devices through wireless communication. The wireless communication may adopt a communication standard or protocol, including but not limited to global system of mobile communication (GSM), general packet radio service (GPRS), and code division multiple access (CDMA), wideband code division multiple access (WCDMA), long term evolution (LTE), e-mail, short messaging service (SMS), and the like.

The memory 802 may be configured to store software programs and modules. The processor 808 may be configured to execute various functional applications and data processing by running software programs and modules stored in the memory 802. The memory 802 may mainly include a program storing area and a data storing area. The program storing area may be configured to store an operating system, an application required for at least one function (such as a sound playing function, an image playing function), and the like. The data storing area may be configured to store data (such as audio data, phone books) created according to a usage scenario of the electronic device. In addition, the memory 802 may include a high-speed random-access memory and may also include a non-volatile memory, such as at least one of a magnetic disk storage device, a flash storage device, or other volatile solid state storage devices. Accordingly, the memory 802 may also include a memory controller to provide access to the memory 802 by the processor 808 and by the input unit 803.

The input unit 803 may be configured to receive numeric or character information inputted and to generate keyboard, mouse, joystick, optical or trackball signal inputs related to user settings and function controls. In detail, in an embodiment, the input unit 803 may include a touch-sensitive surface and other input devices. Touch-sensitive surface, also known as touch screen or touch control pad, may be configured to collect touch operations of a user on or near the touch-sensitive surface (such as the operation of the user on or near the touch-sensitive surface with a suitable object or accessory, such as a finger, a stylus, or the like) to drive a corresponding connected device according to a preset program. In some examples, the touch- sensitive surface may include a touch detecting device and a touch controller. The touch detecting device may be configured to detect a touch orientation of the user, to detect a signal caused by the touch operation, and to transmits the signal to the touch controller. The touch controller may be configured to receive touch information from the touch detecting device, to convert the touch information into contact coordinates, and to send the touch information to the processor 808. In addition, the touch controller may be configured to receive and execute an instruction from the processor 808. In addition, the touch-sensitive surface may be implemented in a variety of types, including resistive, capacitive, infrared, and surface acoustic waves. In addition to the touch-sensitive surface, the input unit 803 may also include other input devices. In detail, other input devices may include, but are not limited to, one or more of a physical keyboard, a function key (such as volume control button, switch button), a trackball, a mouse, a joystick and the like.

The display unit 804 may be configured to display information entered by the user or information provided to the user as well as various graphical user interfaces of the electronic device. The graphic user interface may be composed of graphics, text, icons, video, and a combination thereof. The display unit 804 may include a display panel. In some examples, the display panel may be configured in the form of a liquid crystal display (LCD), an organic light-emitting diode (OLED), or the like. Further, the touch-sensitive surface may cover the display panel. When a touch operation is detected on or near the touch-sensitive surface, the touch operation is transmitted to the processor 708 to determine a type of the touch event. The processor 808 may provide a vision display on the display panel according to the type of the touch event. A corresponding visual output is provided on the panel. Although illustrated in FIG. 11, the touch-sensitive surface and the display panel are implemented as two separate components to implement input and input functions, in some embodiments, the touch-sensitive surface may be integrated with the display panel to implement the input and output functions.

The electronic device may further include at least one sensor 805, including such as a light sensor, a motion sensor, and other sensors. In detail, the light sensor may include an ambient light sensor and a proximity sensor. The ambient light sensor may be configured to adjust brightness of the display panel based on brightness of ambient light. The proximity sensor may be configured to deactivate the display panel and/or backlight units when the electronic device moves to the ear. As a kind of motion sensor, a gravity acceleration sensor may be configured to detect the magnitude of acceleration in all directions (usually three axes). When the electronic device is in a static state, the gravity acceleration sensor may be configured to detect the magnitude and direction of gravity, to identify a gesture of a phone (such as horizontal and vertical screen switching, related game, magnetometer attitude calibration), vibration recognition related functions (such as pedometer, tapping). The electronic device may also be equipped with a gyroscope, a barometer, a hygrometer, a thermometer, an infrared sensor and the like, which is not described herein.

The audio circuit 806 may include a microphone and a speaker. The microphone may be configured as an audio interface between the user and the electronic device. The audio circuit 806 may be configured to convert audio data received into electronic signal, and transmit the electrical signal to the speaker. The electronic signal may be converted by the speaker to a sound signal for outputted. On the other hand, the microphone may be configured to convert a collected sound signal into an electrical signal. The electronic signal received by the audio circuit 806 may be converted into audio data. The audio data may be outputted to and processed by the processor 808. The processed audio data may be sent via a RF circuitry 801 to another electronic device, or the audio data may be output to the memory 802 for further processing. The audio circuit 806 may also include an earbud jack to provide communication of peripheral earphones with the electronic device.

WiFi is a short-range wireless transmission technology. The electronic device may be configured to send and receive emails, browse web pages, and access streaming media through the WiFi module 807, which provides users with wireless broadband Internet access. Although the WiFi module is illustrated in FIG. 11, it may be understood that the WiFi module may be not an essential component of the electronic device. Instead, the WiFi module may be omitted as needed without changing a basic scope of the present disclosure.

The processor 808 may be a control center of the electronic device, connected to various components of the phone via various interfaces and lines. The processor 808 may be configured to call data stored in the memory 802 by running or executing software programs and/or modules stored in the memory 802, to execute various functions and processing data of the electronic device, for monitoring of the entire phone. In some examples, the processor 808 may include one or more processing cores. For example, the processor 808 may be integrated with an application processor and a modem processor. The application processor may be mainly configured to processes an operating system, a user interface, an application, and the like. The modem processor may be mainly configured to process wireless communications. It may be appreciated that the above described modem processor may also not be integrated into the processor 808.

The electronic device may also include a power source 809 (such as a battery) for supply power to the various components. In some examples, the power source may be logically coupled to the processor 808 via a power management system to manage functions such as charging, discharging, and power management through the power management system. The power supply 809 may also include one or more of a direct current (DC) or alternative current (AC) power source, a rechargeable system, a power failure detection circuit, a power converter or inverter, a power status indicator, and the like.

Although not illustrated, the mobile electronic device may further include a camera, a Bluetooth module, and the like, and details are not described herein. In detail, in this embodiment, the processor 808 of the electronic device may be configured to load an executable file corresponding to routines of one or more application programs into the memory 802 according to following instructions, such that the application programs stored in the memory 402 may be executed by the processor 808 to implement following functions of: receiving an image backup request sent by a first terminal logging into a cloud account, the image backup request carrying a first image to be backed up and the image backup request being configured to request to back up the first image; obtaining summary information of the first image based on the image backup request, the summary information being configured to describe the first image; determining whether the summary information is synchronized to a second terminal logging into the cloud account; and in response to determining that the summary information is not synchronized to the second terminal, synchronizing the summary information to the second terminal.

Various operations of embodiments are provided herein. In an embodiment, one or more operations may constitute computer readable instructions stored on one or more computer readable media that, when executed by an electronic device, cause the computing device to perform the operations. The order in which some or all the operations are described should not be construed as implying that the operations must be sequential. Those skilled in the art will appreciate alternative orders that have the benefit of the present disclosure. Furthermore, it should be understood, not all operations should be presented in every embodiment provided herein.

In addition, the term "preferred" as used herein is intended to serve as an example, instance, or illustration.

Any aspect or design described as "preferred" is not necessarily to be construed as being more advantageous than other aspects or designs. Instead, the use of the word "preferred" is intended to present a concept in a specific manner. The term "or" as used in the present disclosure is intended to mean inclusive "or" rather than an exclusive "or". That is, unless otherwise specified or clear from the context, "X employs A or B" means naturally including any one of the permutations. That is, if X uses A, X uses B, or X uses both A and B, "X uses A or B" may be satisfied in any of the foregoing examples.

Although the present disclosure is illustrated and described with respect to embodiments of the present disclosure, those skilled in the art may make any modifications and variations on understating the specification and the drawings. The present disclosure may include all these modifications and variations and may be only limited by a scope of the appended claims. Regarding various functions performed by the above-described components (e.g., elements, resources), the terms used to describe such components are intended to correspond to a combination of components for performing specified functions (e.g., they are functionally equivalent), although the components (unless otherwise indicated) are not equivalent in structure to the disclosed structure for performing the functions in the exemplary implementations of the present disclosure illustrated herein. In addition, although certain features of the present disclosure is disclosed with respect to only one of several implementations, such features may be combined with one or more features of other implementations as may be desired and advantageous for a given or particular application. Furthermore, the terms "containing", "including", "having," or variants thereof are used in embodiments or claims, which are intended to encompassing in a manner similar to the term "comprising".

Each functional unit in embodiments of the present disclosure may be integrated into a single processing module, or each unit may be physically separated, or two or more units may be integrated into a single module. The above integrated modules may be implemented in the form of hardware or in the form of software functional modules. The integrated modules, if implemented in the form of software functional modules and sold or used as stand-alone products, may also be stored in a computer readable storage medium. The above-mentioned storage medium may be a read only memory, a magnetic disk or an optical disk or the like. Each of the above described devices or systems can perform the method according to embodiments of the present disclosure.

In the above, although the present application is disclosed in the above embodiments, the above embodiments are not intended to limit the present disclosure. Those skilled in the art may make various modifications and amendments without departing from the spirit and scope of the present disclosure. The protective scope of the present disclosure may be determined by the scope defined by the appended claims.

What is claimed is:

1. A method for image synchronization, applicable to a server, wherein the method comprises:
receiving an image backup request sent by a first terminal logging into a cloud account, the image backup request carrying a first image to be backed up and the image backup request being configured to request to back up the first image;
obtaining summary information of the first image based on the image backup request, the summary information being configured to describe the first image;

determining whether the summary information is synchronized to a second terminal logging into the cloud account; and in response to determining that the summary information is not synchronized to the second terminal, synchronizing the summary information to the second terminal.

2. The method of claim 1, wherein obtaining the summary information of the first image based on the image backup request comprises:

extracting the first image from the image backup request; and generating a thumbnail of the first image and determining the thumbnail of the first image as the summary information of the first image.

3. The method of claim 1, wherein obtaining the summary information of the first image based on the image backup request comprises:

extracting descriptive information of the first image from the image backup request in response to determining that the image backup request carries the descriptive information; and determining the descriptive information of the first image as the summary information of the first image.

4. The method of claim 3, wherein the descriptive information comprises at least one of: image type information, image size information, image capturing time information, image capturing location information or image version information.

5. The method of claim 1, further comprising:

obtaining an image synchronization request sent from the second terminal for obtaining a second image, the second image being a version of the first image with a preset resolution;

processing the first image to generate the second image having the preset resolution; and sending the second image to the second terminal.

6. The method of claim 5, wherein processing the first image to generate the second image having the preset resolution comprises:

retrieving the first image based on an image identifier of the first image in response to determining that the image synchronization request carries the image identifier of the first image and the preset resolution; and processing the first image based on the preset resolution to obtain the second image.

7. The method of claim 5, wherein sending the second image to the second terminal comprises:

encrypting the second image; and sending an encrypted second image to the second terminal.

8. The method of claim 1, wherein determining whether the summary information is synchronized to the second terminal logging into the cloud account comprises:

in response to detecting that the second terminal logs into the cloud account, obtaining terminal information of the second terminal; and determining whether the summary information is synchronized to the second terminal by querying a synchronization record based on the terminal information, the synchronization record being generated when the server performs a synchronization operation and being configured to record information of the synchronization operation.

9. The method of claim 8, further comprising:

updating the synchronization record after synchronizing the summary information is completed.

10. A server, comprising: a memory, a processor and a computer program stored on the memory and executable by the processor, wherein when the computer program is executed by the processor, the processor is caused to implement:

receiving an image backup request sent by a first terminal logging into a cloud account, the image backup request carrying a first image to be backed up and the image backup request being configured to request to back up the first image;

obtaining summary information of the first image based on the image backup request, the summary information being configured to describe the first image;

determining whether the summary information is synchronized to a second terminal logging into the cloud account; and in response to determining that the summary information is not synchronized to the second terminal, synchronizing the summary information to the second terminal.

11. The server of claim 10, wherein obtaining the summary information of the first image based on the image backup request comprises:

extracting the first image from the image backup request; and generating a thumbnail of the first image and determining the thumbnail of the first image as the summary information of the first image.

12. The server of claim 10, wherein obtaining the summary information of the first image based on the image backup request comprises:

extracting descriptive information of the first image from the image backup request, in response to determining that the image backup request carries the descriptive information; and determining the descriptive information of the first image as the summary information of the first image.

13. The server of claim 12, wherein the descriptive information comprises at least one of: image type information, image size information, image capturing time information, image capturing location information or image version information.

14. The server of claim 10, wherein, the processor is further caused to implement:

obtaining an image synchronization request sent from the second terminal for obtaining a second image, the second image being a version of the first image with a preset resolution;

processing the first image to generate the second image having the preset resolution; and sending the second image to the second terminal.

15. The server of claim 14, wherein processing the first image to generate the second image having the preset resolution comprises:

retrieving the first image based on an image identifier of the first image in response to determining that the image synchronization request carries the image identifier of the first image and the preset resolution; and processing the first image based on the preset resolution to obtain the second image.

16. The server of claim 14, wherein sending the second image to the second terminal comprises:

encrypting the second image; and sending an encrypted second image to the second terminal.

17. The server of claim 10, wherein determining whether the summary information is synchronized to the second terminal logging into the cloud account comprises:

in response to detecting that the second terminal logs into the cloud account, obtaining terminal information of the second terminal; and determining whether the summary information is synchronized to the second terminal by querying a synchronization record based on the terminal information, the synchronization record being generated when the server performs a synchronization operation and being configured to record information of the synchronization operation.

18. The server of claim 17, wherein, the processor is further caused to implement:

updating the synchronization record after synchronizing the summary information is completed.

19. A non-transitory computer readable storage medium, having a plurality of instructions stored thereon, wherein when the instructions are executed by a processor, the processor is configured to:

receive an image backup request sent by a first terminal logging into a cloud account, the image backup request carrying a first image to be backed up and the image backup request being configured to request to back up the first image;

obtain summary information of the first image based on the image backup request, the summary information being configured to describe the first image;

determine whether the summary information is synchronized to a second terminal logging into the cloud account; and in response to determining that the summary information is not synchronized to the second terminal, synchronize the summary information to the second terminal.

20. The non-transitory computer readable storage medium of claim 19, wherein the processor is further configured to:

obtain an image synchronization request sent from the second terminal for obtaining a second image, the second image being a version of the first image with a preset resolution;

process the first image to generate the second image having the preset resolution; and send the second image to the second terminal.

* * * * *